United States Patent [19]
Kraus

[11] 3,841,173
[45] Oct. 15, 1974

[54] TURBINE DRIVE
[75] Inventor: Charles Edward Kraus, Austin, Tex.
[73] Assignee: Excelermatic, Inc., Leesburg, Va.
[22] Filed: May 7, 1973
[21] Appl. No.: 357,795

[52] U.S. Cl. ................................... 74/751, 74/200
[51] Int. Cl. ........................ F16h 3/74, F16h 15/08
[58] Field of Search .......... 74/190, 200, 751, 752 C, 74/752 D

[56] References Cited
UNITED STATES PATENTS

| | | | |
|---|---|---|---|
| 2,196,064 | 4/1940 | Erban | 74/751 X |
| 2,380,064 | 7/1945 | Hardone | 74/751 |
| 2,485,126 | 10/1949 | Wood | 74/752 C X |
| 2,525,946 | 10/1950 | Roberts | 74/751 |
| 3,296,894 | 1/1967 | Moan | 74/751 |

*Primary Examiner*—Samuel Scott
*Assistant Examiner*—P. S. Lall

[57] ABSTRACT

A gas turbine engine drive includes a flywheel coupled to the turbine through an infinitely variable speed transmission whose transmission ratio is varied so as to permit energy stored in the flywheel to be transmitted to the turbine during acceleration of the turbine to prevent turbine stalling.

8 Claims, 2 Drawing Figures

PATENTED OCT 15 1974　　　　　　　　　　　　3,841,173

TURBINE DRIVE

BACKGROUND OF THE INVENTION

Single shaft gas turbines in which the compressor and the turbine sections are mounted on a common shaft have poor torque characteristics and relatively little power at less than full speed because, at lower speeds, the pressure and the amount of air delivered by the compressor are low and both are increased only gradually as more or full power is required from the turbine. Unlike that of piston engines, the torque-over-speed curve of a single shaft gas turbine has its maximum at full rated speed from which maximum it drops rapidly for lower speeds. Therefore, acceleration of the turbine is not only slow but also relatively little power can be derived from the turbine during acceleration until it approaches full speed. In fact, sudden requiring of full power from a single shaft gas turbine running at low speed usually causes stalling of the turbine. The use of such a turbine for driving a vehicle has, therefore, always resulted in poor vehicle performance. Operation of the turbine at full speed at all times, though facilitating good performance of a vehicle, would cause low operating efficiency. Particularly the tendency of the turbine to stall whenever full power is suddenly required from the turbine has kept automotive engineers from considering a gas turbine for use in motor vehicles.

SUMMARY OF THE INVENTION

A gas turbine is coupled with a flywheel through an infinitely variable speed transmission to permit transmission of energy from the flywheel to the turbine drive during acceleration of the turbine thereby permitting fast acceleration of the turbine and any load connected thereto.

DESCRIPTION OF THE PREFERRED EMBODIMENT

Figure 1:
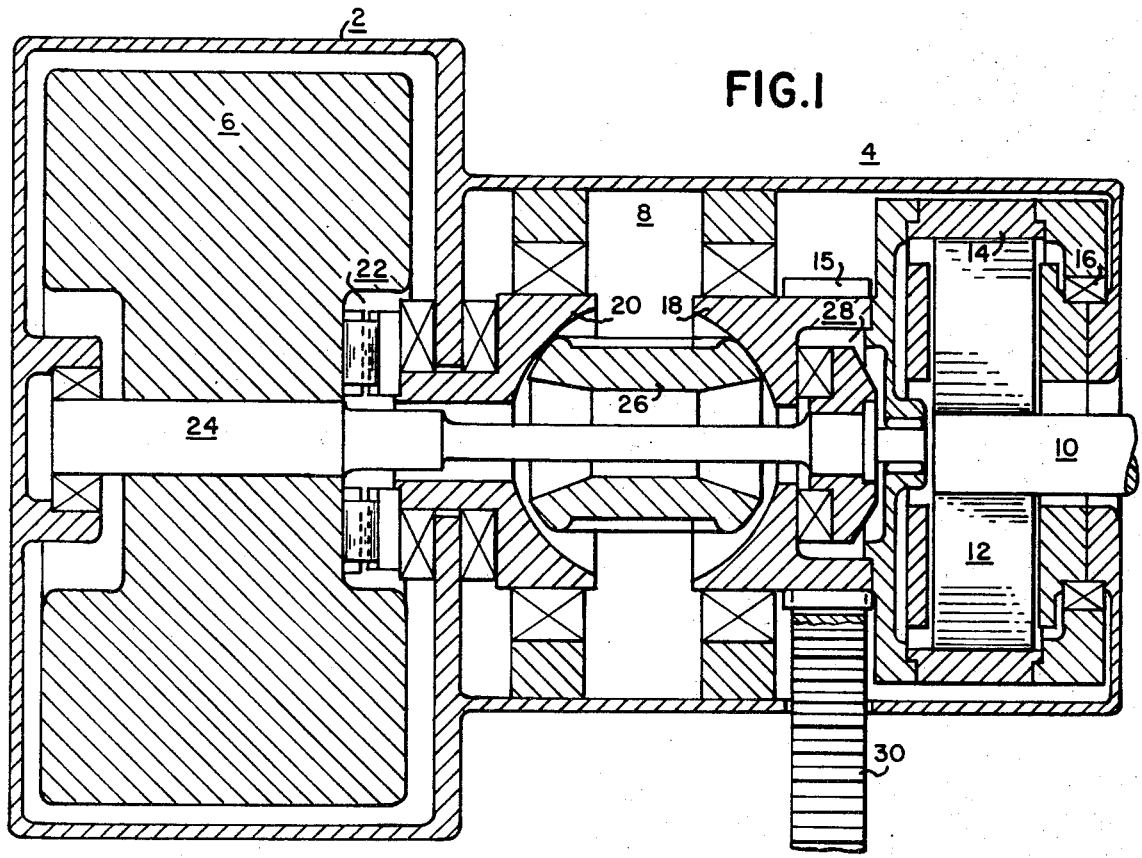
FIG. 1 shows a turbine drive having a flywheel connected thereto through an infinitely variable speed transmission.

As shown in FIG. 1, the turbine drive includes in a housing 2, a turbine speed reduction drive 4, which is coupled with an energy storing flywheel 6 through an infinitely variable speed transmission 8. The output shaft 10 of a single shaft gas turbine extends into the speed reduction drive 4 which is preferably of the type described in U.S. application Ser. No. 269,531, filed July 7, 1972 now U.S. Pat. No. 3,760,646 in the name of the inventor of the present application. In the speed reduction drive 4, the shaft 10 is in engagement with planetary rollers 12 which drive the rim 14 at substantially reduced speed, the transmission ratio being, for example, 5 to 1. The rim 14 is supported at one side by bearings 16 and, at the other side, is connected to the toric element 18 of the infinitely variable speed transmission 8 which is preferably of the type described in U.S. Pat. application Ser. No. 227,776, filed Feb. 22, 1972, now U.S. Pat. No. 3,760,646 in the name of the present inventor.

The flywheel 6 is mounted for rotation with the other toric element 20 of the transmission 8 through an axial loading arrangement 22 and is supported by a shaft 24 journaled in the housing 2 and extending through the hollow spool 26 to provide axial support for the toric element 18 for firm engagement of the toric elements 18 and 20 with the spool 26 when a torque is transmitted therethrough. Since the transmission 8 with its axial loading arrangement 22 and the axial support arrangement 28 for the toric element 18 is fully described in U.S. application Ser. No. 227,776, now U.S. Pat. No. 3,776,051, no further details are explained. However, as shown in the drawing, the rim 14 has an output gear 15 associated therewith which is in engagement with an output gear 30, both forming part of the drive train of a vehicle.

The transmission ratio of the infinitely variable speed transmission 8 is controlled in such a manner that the relative speed changes between engine and flywheel 6 are the inverse of each other: When the turbine is, for example, at idle speed the flywheel 6 is at maximum speed and is maintained at such maximum speed until acceleration of the vehicle and the turbine is demanded. At this point, the transmission ratio of the transmission 8 is changed such that the speed of the flywheel is reduced whereby the kinetic energy stored in the flywheel is used to accelerate the vehicle, the turbine, or both. The flywheel is preferably dimensioned to be able to store sufficient energy for taking over full acceleration of the vehicle for the few seconds needed to bring the turbine up to or near full speed.

While the vehicle and the turbine accelerate, the flywheel speed becomes lower and reaches its minimum speed when the turbine reaches full speed at which point the turbine can supply sufficient power to further accelerate the vehicle preferably through an infinitely variable speed transmission forming part of the vehicle drive train.

When the turbine speed is reduced, either alone or together with the vehicle speed, that is when full power is no longer needed, the flywheel is accelerated thereby storing most of the energy which is derived from the turbine drive during deceleration of the turbine.

During startup, a starter (not shown) accelerates the turbine close to idle speed which is 50 percent of its rated speed (about 25,000 rpm). At this speed, the turbine compressor provides sufficient compressed air to sustain operation of the turbine. Assuming a transmission ratio in the speed reduction drive 4 of 5:1 and an adjustable ratio of 2:1 in the variable speed transmission 8, the flywheel speed will then be at about 2,500 rpm. At this point, automatic control causes a change of the ratio of the variable speed transmission 8, for example, from 2:1 to 1:2 thereby accelerating the flywheel to a speed of about 10,000 rpm. From hereon the flywheel and turbine speed are inverse of each other maintained by automatic speed control.

In this example, full turbine speed ($S_2$) is twice the turbine idle speed ($S_1$) and the variable speed transmission has a range from 2:1 to 1:2, that is a 4 to 1 range. The range of the variable speed transmission should, of course, be larger than $S_2/S_1$.

Figure 2:
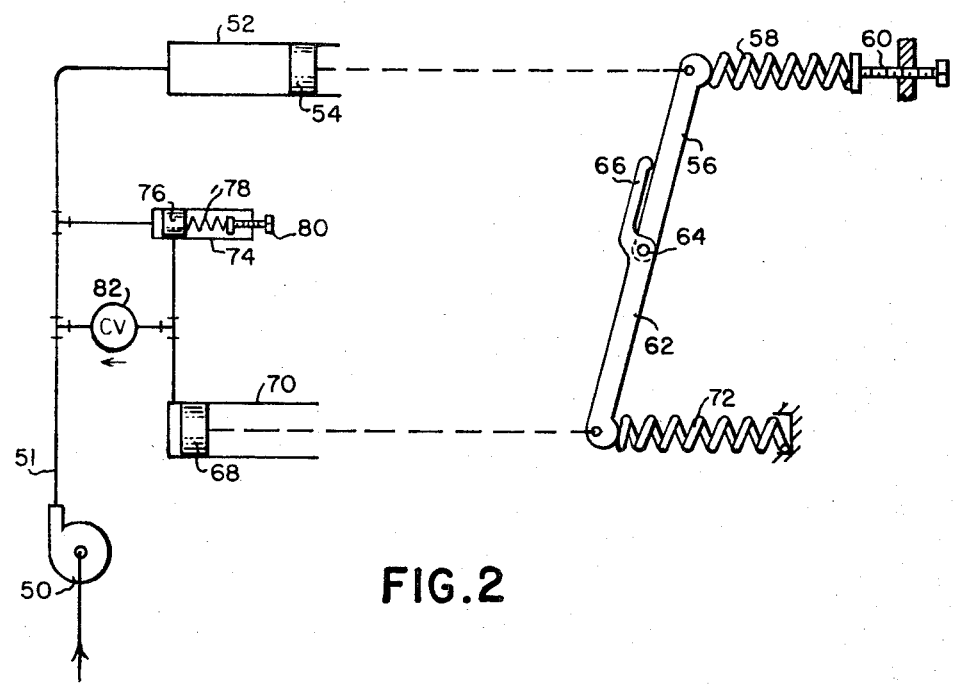
FIG. 2 shows schematically a hydraulic control arrangement for controlling the flywheel speed relative to the turbine speed.

A simple hydraulic control arrangement for controlling the flywheel speed depending on the turbine speed is shown in FIG. 2. The turbine has coupled with its shaft a control pump 50 which provides a hydraulic fluid pressure essentially proportional to the turbine's speed. The output of the pump 50 is in communication with a cylinder 52 receiving a piston 54 which is operatively connected to the transmission ratio control lever 56 of the transmission 8. The control lever 56 and, accordingly, the piston 54 are biased by a spring 58 in a direction against the control fluid with a predetermined force corresponding to the pressure provided by the pump at idle speed of the turbine. The biasing force is preferably adjustable as by an adjusting screw 60.

A lever 62 is preferably supported on the shaft 64 of the control lever 56 and, at its free end, is linked to a piston 68 disposed in a cylinder 70. The lever 62 has an extension 66 which engages the control lever 56 and is biased by a spring 72 in a direction to force the control lever 56 to its low transmission ratio end position against the force of the spring 58. The interior of the cylinder 70 is in communication with the discharge line 51 of the pump 50 under the control of a control valve 74 including a control piston 76 biased into a valve closing position by a spring 78 whose force is adjustable by rotating the screw 80. A check valve 82 permits return flow of control fluid when the pump pressure becomes lower than the pressure in the cylinder 70.

During startup while the turbine is accelerated by the starter, the spring 72 and lever 62 hold the transmission ratio control lever 56 in its low transmission ratio end position. After the turbine has reached self-sustaining speed the discharge pressure of the pump 50 has increased to the point where the control valve 74 opens thereby admitting pressurized fluid to the cylinder 70. This causes outward movement of the piston 68 and pivoting of the lever 62 against the force of the spring 72 which permits the spring 58 to move the piston 54 into the cylinder 52 and the transmission ratio control lever 56 to its high transmission ratio end position thereby accelerating the flywheel to full speed. The spring 58 is so adjusted that it balances the fluid pressure on the piston in the high transmission ratio end position during idle speed which is about 50 percent of full turbine speed.

When the turbine speed is increased from this point the discharge pressure of the pump increases and forces the piston 54 out of the cylinder 52 and the control lever 56 toward its low transmission ratio end position which is reached when the turbine has reached full speed. During turbine speed up from idle to full speed, the energy stored in the flywheel is applied to the turbine drive through the transmission 8. When the turbine speed is reduced from full speed, the control lever 56 is moved back toward its high transmission ratio end position whereby the flywheel speed is again increased for storage of energy.

With the arrangement described herein, sufficient power can be derived from the flywheel to accelerate the turbine and a vehicle driven by the turbine until the turbine can provide sufficient power to the vehicle drive. Stalling of the turbine will therefore no longer occur. In fact, excellent acceleration can be obtained with a vehicle having only a relatively small turbine, that is, a vehicle turbine does not need to be oversized just to provide sufficient acceleration for the vehicle.

The invention however is not limited to the arrangement as described. It is, for example, possible to use any type of infinitely variable speed transmission to couple the flywheel with the turbine drive although the transmission shown in U.S. Pat. application Ser. No. 227,776, now U.S. Pat. No. 3,760,646 is presently preferred.

Also, an electrical control arrangement may be provided wherein, for example, an electric motor is coupled with the transmission control lever and energized during startup to hold the lever in lowest transmission ratio position until the turbine reaches self-sustaining speed at which point the voltage from a speedometer generator causes the polarity of the motor to be reversed so that the motor moves the control lever to its high transmission ratio end position thereby causing acceleration of the flywheel which reaches full speed when the turbine reaches idle speed. From here on, any further increase of voltage generated by the speedometer generator is matched by a corresponding movement of the control lever toward its low transmission ratio end position until, at full turbine speed, the flywheel has transmitted all its available energy to the turbine drive.

What is claimed is:

1. A gas turbine drive for driving a rapidly variable load, comprising: a gas turbine engine including a gas turbine and a compressor having a common shaft, said gas turbine engine having an operational speed range between full speed and a lower idle speed; a flywheel coupled to said gas turbine for storage of energy; an infinitely variable speed transmission disposed as a power transmission link between the gas turbine engine and the flywheel for the exchange of energy between said flywheel and the gas turbine engine; control means for changing the transmission ratio of said infinitely variable speed transmission such that the flywheel speed is decreased as the gas turbine engine speed is increased and the flywheel speed is increased as the turbine speed decreases; and means operatively connecting said gas turbine engine to said variable load.

2. An gas turbine drive as claimed in claim 1, wherein said infinitely variable speed transmission is a friction wheel transmission.

3. An gas turbine drive as claimed in claim 1, wherein the relative speeds of the turbine and the flywheel between idle and full speed are the inverse of one another.

4. An gas turbine drive as claimed in claim 1, wherein the turbine is coupled to a vehicle drive.

5. An arrangement as claimed in claim 4, wherein the turbine is coupled to the vehicle drive through an infinitely variable speed transmission.

6. A gas turbine drive as claimed in claim 1, wherein the transmission ratio range is essentially larger than S1/S2 if S2 is full turbine speed and S1 is idle speed of the turbine, said control means providing the highest transmission ratio at turbine idle speed and the lowest transmission ratio at full turbine speed so that the flywheel has its lowest speed at full turbine speed and its highest speed at turbine idle speed.

7. An gas turbine drive as claimed in claim 6, wherein turbine idle speed is about 50 percent of full turbine speed and the ratio range of the infinitely variable speed transmission is about 4:1.

8. An gas turbine drive as claimed in claim 6, wherein means are provided to retain the transmission ratio at its lowest value during startup of the turbine at least until the turbine has reached self-sustaining speed whereupon a change to the highest transmission ratio is permitted to bring the flywheel to full speed at turbine idle speed.

* * * * *